United States Patent
Narayanam et al.

(10) Patent No.: US 11,048,674 B2
(45) Date of Patent: Jun. 29, 2021

(54) DATA DEDUPLICATION WITH LESS IMPACT ON SPEED OF ACCESS

(71) Applicant: International Business Machines Corporation, Armonk, NY (US)

(72) Inventors: Krishnasuri Narayanam, Bangalore (IN); Ramasuri Narayanam, Andhra Pradesh (IN); Mukundan Sundararajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 16/190,967

(22) Filed: Nov. 14, 2018

(65) Prior Publication Data

US 2020/0151267 A1    May 14, 2020

(51) Int. Cl.
*G06F 16/215* (2019.01)
(52) U.S. Cl.
CPC .................. *G06F 16/215* (2019.01)
(58) Field of Classification Search
CPC .... G06F 16/215; G06F 16/1752; G06F 16/11; G06F 16/1727; G06F 16/183
USPC ................................ 707/692, 693
See application file for complete search history.

(56) References Cited

U.S. PATENT DOCUMENTS

| | | | |
|---|---|---|---|
| 7,504,969 B2 | 3/2009 | Patterson et al. | |
| 7,519,635 B1 | 4/2009 | Haustein et al. | |
| 8,205,065 B2 | 6/2012 | Matze | |
| 8,280,859 B2 | 10/2012 | Anglin et al. | |
| 8,463,981 B2 | 6/2013 | Mori et al. | |
| 8,660,994 B2 | 2/2014 | Slater et al. | |
| 8,751,763 B1 * | 6/2014 | Ramarao | G06F 16/1752 711/162 |
| 8,762,349 B2 | 6/2014 | Jayaraman et al. | |
| 9,110,602 B2 | 8/2015 | Vijayan et al. | |

(Continued)

OTHER PUBLICATIONS

Park, "Hot and Cold Data Identification: Applications to Storage Devices and Systems", Dissertation, University of Minnesota Digital Conservancy, http://hdl.handle.net/11299/139066, Aug. 2012, 143 pages.

(Continued)

*Primary Examiner* — James Trujillo
*Assistant Examiner* — Fariborz Khoshnoodi
(74) *Attorney, Agent, or Firm* — Scully, Scott, Murphy & Presser, P.C.; Scott Dobson, Esq.

(57) ABSTRACT

A method, system and computer readable program storage device for performing data deduplication. In an embodiment, the method comprises receiving input data for storage in a data storage. The input data comprises a multitude of data blocks, and the data blocks are accessed at different times in the data storage by a given application. The method further comprises selecting, by a processor device, one or more of the data blocks for data deduplication based on when the data blocks are accessed by the given application. In an embodiment, the selecting data blocks for data deduplication includes selecting data blocks for deduplication to obtain a target deduplication ratio. In an embodiment, the selecting data blocks for data deduplication includes selecting for the deduplication data blocks that are accessed later by the given application relative to data blocks that are accessed earlier by the given application.

17 Claims, 5 Drawing Sheets

(56) References Cited

U.S. PATENT DOCUMENTS

| | | | |
|---|---|---|---|
| 9,569,357 B1* | 2/2017 | Shalev | G06F 12/0261 |
| 10,192,207 B1* | 1/2019 | Auchmoody | G06F 11/1453 |
| 2014/0325147 A1* | 10/2014 | Nayak | G06F 3/0619 |
| | | | 711/114 |
| 2015/0019508 A1* | 1/2015 | Aronovich | G06F 16/1752 |
| | | | 707/692 |
| 2015/0309880 A1 | 10/2015 | Barajas Gonzalez et al. | |
| 2017/0255643 A1* | 9/2017 | Maheshwari | G06F 16/182 |
| 2017/0329815 A1 | 11/2017 | Fiske et al. | |

OTHER PUBLICATIONS

Unknown, "Gartner analyst on data dedeuplication for primary storage", https://searchstorage.techtarget.com/podcast/Gartner-analyst-on-data-deduplication-for-primary-storage, last published in Dec. 2009, 7 pages.

Ellis, "What are the differences between file-level vs. block-level deduplication?", https://searchdatabackup.techtarget.com/answer/What-are-the-differences-between-file-level-vs-block-level-deduplication, last published Jan. 2010, 6 pages.

Whitehouse, "The pros and cons of file-level vs. block-level data deduplication technology", https://searchdatabackup.techtarget.com/tip/The-pros-and-cons-of-file-level-vs-block-level-data-deduplication-technology, last published Sep. 2008, 6 pages.

Pariseau, "NetApp adds data deduplication for primary storage", https://searchdatabackup.techtarget.com/news/1299840/NetApp-adds-data-deduplication-for-primary-storage, May 15, 2007, 5 pages.

Leesakul et al., "Dynamic Data Deduplication in Cloud Storage", 2014 IEEE 8th International Symposium on Service Oriented System Engineering, Apr. 7-11, 2014, Oxford, UK, http://eprints.whiterose.ac.uk/94869/1/wara.pdf, pp. 320-325.

"File-level vs Block-level vs byte-level deduplication", StarWind Software, Wayback Machine, published at least as early as Jun. 6, 2011, https://www.starwindsoftware.com/file-level-vs-block-level-vs-byte-level-deduplication, 5 pages.

* cited by examiner

DATA DEDUPLICATION WITH LESS IMPACT ON SPEED OF ACCESS

BACKGROUND

This invention generally relates to data deduplication, and more specifically, to deduplicating data, in a data storage process, in a way that reduces the impact of the data deduplication on the speed of access to the stored data.

Data deduplication is a very important and vibrant field in computing storage systems. Data deduplication refers to the reduction and/or elimination of redundant data. In data deduplication, a data object, which may be a file, a data stream or some other form of data, is broken down into one or more parts called chunks or blocks. Duplicate copies of data are reduced or eliminated, leaving a minimal amount of redundant copies, or a single copy of the data, respectively.

Data deduplication identifies repeated blocks of data in a data stream or on a storage disk, and eliminates the redundancy by just storing the repeated data items only once. Any other occurrence of the same block of data will be referenced by creating a link to the already stored block.

SUMMARY

Embodiments of the invention provide a method, system and computer readable program storage device for performing data deduplication by a processor device. In an embodiment, the method comprises receiving input data for storage in a data storage, the input data comprising a multitude of data blocks, and wherein the data blocks are accessed at different times in the data storage by a given application; and selecting, by the processor device, one or more of the data blocks for data deduplication based on when the data blocks are accessed in the data storage by the given application.

In an embodiment, the selecting one or more of the data blocks for data deduplication includes selecting the one or more of the data blocks for data deduplication to obtain a target deduplication ratio. In an embodiment, the selecting one or more of the data blocks for data deduplication includes selecting for the data deduplication ones of the data blocks that are accessed by the given application later in time relative to others of the data blocks that are accessed by the given application earlier in time.

Embodiments of the invention provide a system for managing data storage on a computer by performing selective data deduplication. In an embodiment, the system comprises a data storage and a deduplicaiton processor device. The data storage is for receiving and storing input data. The input data comprises a multitude of data blocks, and the data blocks are accessed at different times in the data storage by a given application. The deduplication processor device is for data deduplicating a selected one or more of the data blocks based on when the data blocks are accessed in the data storage by the given application to reduce storage space in the data storage needed to store the data blocks. In an embodiment, the deduplication processor device selects one or more of the data blocks for data deduplication to obtain a target deduplication ratio.

Data deduplication can substantially reduce the amount of storage space needed to store a given amount of data. There are, however, also important challenges with data deduplication; and in particular, data deduplication may adversely affect write performance and may significantly increase access latency.

Embodiments of the invention provide improved speeds while accessing the data from storage.

Embodiments of the invention are applicable to file accesses with sequential writes as well.

In embodiments of the invention, the data blocks chosen for deduplication are the ones which get accessed later in time, relative to the blocks which get accessed earlier, during the corresponding file access by the application. In embodiments of the invention, this is done by maintaining information on the size of each file; and file maps to different data blocks, and blocks are chosen appropriately for data deduplication.

DETAILED DESCRIPTION

Data deduplication refers to the reduction and/or elimination of redundant data. In data deduplication, a data object, which may be a file, a data stream, or some other form of data, is broken down into one or more parts called chunks or blocks. Data deduplication identifies repeated blocks of data in a data stream or on a storage disk, and eliminates the redundancy by just storing the repeated data items only once. Any other occurrence of the same block of data will be referenced by creating a link to the already stored block.

One measure of the amount of data storage space that can be saved by using data deduplication is referred to as the data deduplication ratio. This ratio is the ratio of the storage space needed to store data without deduplication, to the storage space needed to store the data with deduplication. Data deduplication ratios of 20:1 or more can be achieved.

Figure 1:
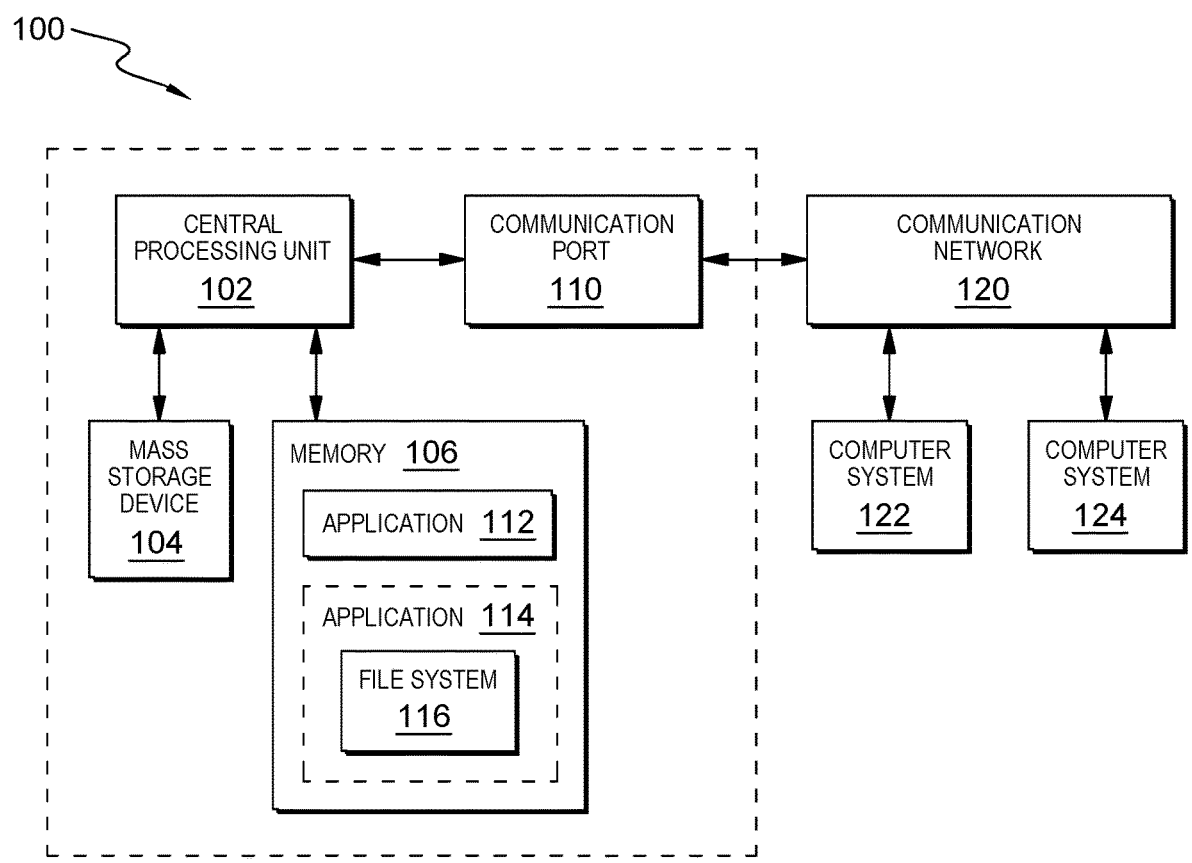
FIG. 1 is a block diagram illustrating an exemplary computing system for performing data deduplication according to embodiments of the present invention.

FIG. 1 illustrates an exemplary architecture 100 of a computing system environment that may be used for effecting data deduplication in embodiments of the invention. Computer system 100 includes central processing unit (CPU) 102, which is connected to mass storage device(s) 104, memory device 106, and communication port 108. Mass storage devices 104 may include hard disk drive (HDD) devices, which may be configured in a redundant array of independent disks (RAID). The data management operations, in which aspects of the present invention may be implemented as further described, may be executed on device(s) 104, located in system 100 or elsewhere. Memory device 106 may include such memory as electrically erasable programmable read only memory (EEPROM) or a host of related devices.

Memory 106 is shown including an application program 112, and an application program 114, in which a file system 116 is operational. Application 112 and 114 may create, delete, or otherwise manage segments of data, such as data chunks or data blocks, which are physically stored in devices such as mass storage device 104. File system 110 provides a means to organize data expected to be retained after the application program 114 terminates by providing procedures to store, retrieve, and update data, as well as manage the available space on the device(s) that contain the data.

The file system 116 organizes data in an efficient manner, and is tuned to the specific characteristics of the device (such as computer 100 and/or memory 106). In one embodiment, application 114 may be an operating system (OS), and file system 116 retains a tight coupling between the OS and the file system 116. File system 116 may provide mechanisms to control access to the data and metadata, and may contain mechanisms to ensure data reliability such as those that may be used in embodiments of the invention, as one of ordinary skill in the art will appreciate. File system 116 may provide a means for multiple application programs 112, 114 to update data in the same file at nearly the same time.

In the illustrated embodiment, memory device 106 and mass storage device 104 are connected to CPU 102 via a signal-bearing medium. In addition, CPU 102 is connected through communication port 110 to a communication network 120, having an attached plurality of additional computer systems 122 and 124. The computer system 100 may include one or more processor devices (e.g., CPU 102) and additional memory devices 106 for each individual component of the computer system 100 to execute and perform each operation described herein to accomplish the purposes of the present invention.

Figure 2:
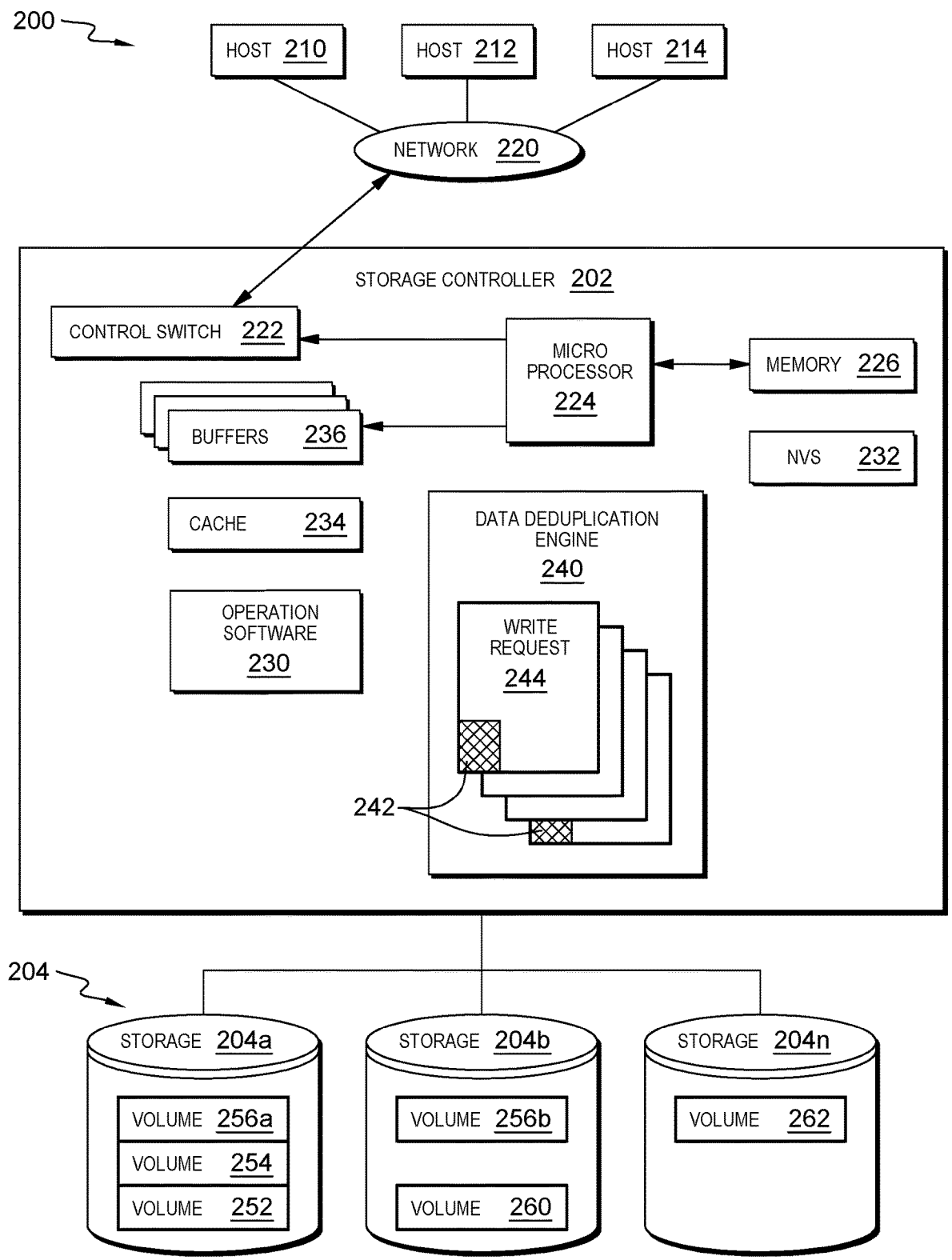
FIG. 2 is a block diagram showing a hardware structure of a data storage system in which aspects of this invention may be implemented.

FIG. 2 is an exemplary block diagram 200 showing a hardware structure of a data storage system in a computer system according to the present invention. Data storage system 200 is depicted in FIG. 2 comprising storage controller 202 and storage 204. FIG. 2 also shows host computers 210, 212, 214, each of which acts as a central processing unit for performing data processing as part of the data storage system 200. The hosts (physical or virtual devices) 210, 212, and 214 may be one or more new physical devices or logical devices to accomplish the purposes of the present invention in the data storage system 200. The hosts 210, 212, and 214 may be local or distributed among one or more locations and may be equipped with any type of fabric (or fabric channel) (not shown in FIG. 2) or network adapter 220 to the storage controller 202, such as Fibre channel, FICON, ESCON, Ethernet, fiber optic, wireless, or coaxial adapters.

The storage controller 202 includes a control switch 222, a microprocessor 224 for controlling the storage controller 202, a system memory 226 for storing a microprogram (operation software) 230 for controlling the operation of storage controller 202, an associated nonvolatile storage ("NVS") 232, cache 234 for temporarily storing (buffering) data, and buffers 236 for assisting the cache 234 to read and write data. Storage controller 202 also includes compression operation module 240 and compression operation list module 242 in which information may be set. Control switch 222 is for controlling the fiber channel protocol to the host computers 210, 212, 214, and is also for controlling a protocol to control data transfer to or from the storage device 204.

Storage controller 202 is shown in FIG. 2 as a single processing unit, including the microprocessor 224, system memory 226 and the NVS 232. It is noted that in some embodiments, storage controller 202 is comprised of multiple processing units, each with their own processor complex and system memory, and interconnected by a dedicated network within data storage system 200.

In one embodiment, the operation of the system shown in FIG. 2 will be described. The microprocessor 224 may control the memory 226 to store command information from the host device (physical or virtual) 210 and information for identifying the host device (physical or virtual) 210. The control switch 222, the buffers 236, the cache 234, the operating software 230, the microprocessor 224, memory 226, NVS 232, compression operation module 240 and compression operation list module 242 are in communication with each other and may be separate or one individual component(s). Also, several, if not all of the components, such as the operation software 230 may be included with the memory 226. Each of the components within the devices shown may be linked together and may be in communication with each other for purposes suited to the present invention.

A data deduplication engine 240 processes write requests 244. The data deduplication engine 240 may be structurally one complete module or may be associated and/or incorporated within other individual modules. Data deduplication engine 240 is configured for performing, in conjunction with other components of storage controller 202 such as microprocessor 224, data deduplication operations on write data passed through storage controller 202 to storage 204.

The NVS 232 may also be referred to as a "persistent" cache or "cache memory" and is implemented with nonvolatile memory that may or may not utilize external power to retain data stored therein. The NVS may be stored in and with the cache 234 for any purposes suited to accomplish the objectives of the present invention. In some embodiments, a backup power source (not shown in FIG. 2), such as a battery, supplies NVS 232 with sufficient power to retain the data stored therein in case of power loss to data storage system 200.

Storage 204 may be comprised of one or more storage devices, such as storage arrays, which are connected to storage controller 202 by a storage network. A storage array is a logical grouping of individual storage devices, such as a hard disk. In certain embodiments, storage 204 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," and may have different kinds of allocations. Storage 204a, 204b and 204n are shown as ranks in data storage system 200, and are referred to herein as rank 204a, 204b and 204n. Ranks may be local to data storage system 200, or may be located at a physically remote location. In other words, a local storage controller may connect with a remote storage controller and manage storage at the remote location. Rank 204a is shown configured with two entire volumes, 252 and 254, as well as one partial volume 256a. Rank 204b is shown with one entire volume 260 and another partial volume 256b. Thus volume 256 is allocated across ranks 204a and 204b.

Rank 204n is shown as being fully allocated to volume 262—that is, rank 204n refers to the entire physical storage for volume 262. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

Those of ordinary skill in the art will appreciate that the architecture and hardware depicted in FIGS. 1 and 2 may vary. Not all the illustrated components may be required to practice the invention, and variations in the arrangement and type of the components may be made without departing from the spirit or scope of the invention.

As mentioned above, data deduplication can substantially reduce the amount of storage space needed to store a given amount of data. There are, however, also important challenges with data deduplication. In particular, data deduplication can negatively impact the performance of the data storage system when writing the data to storage. Data deduplication also may result in significant delays when accessing the stored data. Due to the reconstruction of the data before access from the storage, the time need to access data is more, when compared to the time needed to access the same data without deduplication.

Given a target deduplication ratio, embodiments of the invention provide improved speed while accessing the data from the storage. When techniques disclosed herein are implemented, the speed of access of the online streaming data is improved, when compared to the speed of access of the online streaming data without these techniques implemented (while the data is deduplicated with the same deduplication ratio in both cases).

In embodiments of the invention, the data blocks chosen for deduplication are the ones which get accessed later in time, relative to the data blocks which get accessed early during the corresponding file access by the application. In embodiments of the invention, this is done by maintaining information on the size of each "file", and files map to the different data blocks, and data blocks are appropriately chosen for deduplication.

The application data files being accessed vary in size. It takes a lot of time while streaming/downloading the complete file over network/cloud. Initial blocks of the file data are accessed early in time relative to the later blocks of the file data.

Embodiments of the invention apply data deduplication (if needed, with a high deduplication ratio) on the blocks corresponding to the later parts of the file to achieve the same application level deduplication ratio. Since the initial blocks of the file data are possibly not deduplicated (or deduplicated with a lower deduplication ratio), the file access speed increases. While it takes time to access the initial blocks of the file, the reconstruction for the later blocks of the file data which are deduplicated takes place (thus saving in the reconstruction time for access).

Figure 3:
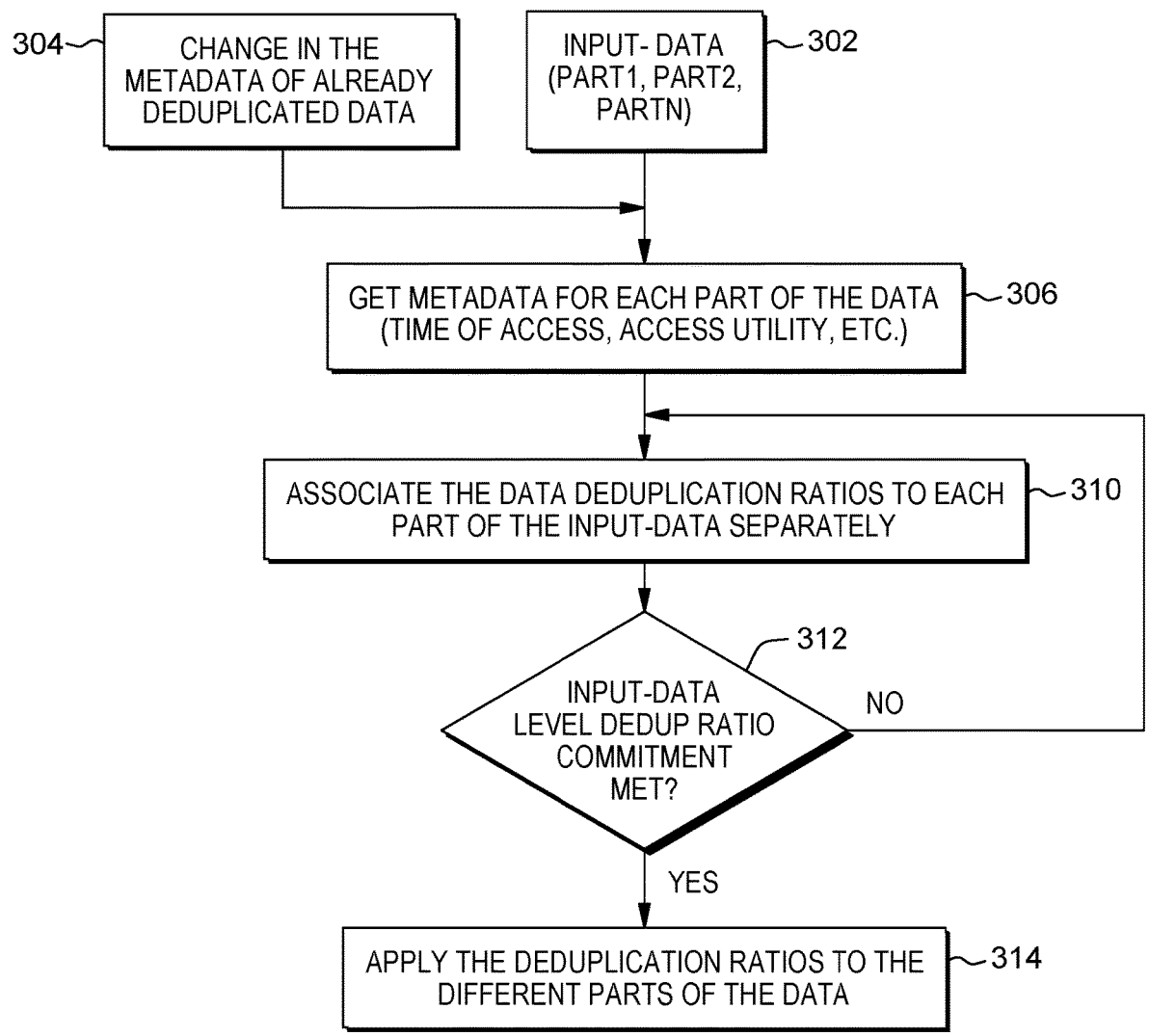
FIG. 3 illustrates a data deduplication procedure in accordance with embodiments of the invention.

FIG. 3 illustrates an example of an algorithm for implementing embodiments of the invention. At 302, data is input. This data is comprised of parts. Block 304 represents changes in the metadata of already deduplicated data. At 306, the input data are received, and metadata are obtained for each part of the data (this metadata may include, for example, time of access, access utility, and other factors). At 310, the data deduplication ratios are associated to each part of the input data separately.

At 312, the system determines if the input-data level deduplication ratio commitment is met. If that ratio commitment is not met, the procedure returns to 310, and steps 310 and 312 are repeated until the deduplication ratio commitment is met. If, at 312, that deduplication ratio commitment is met, the procedure proceeds to 314, and the deduplication ratios are applied to the different parts of the data.

Figure 4:
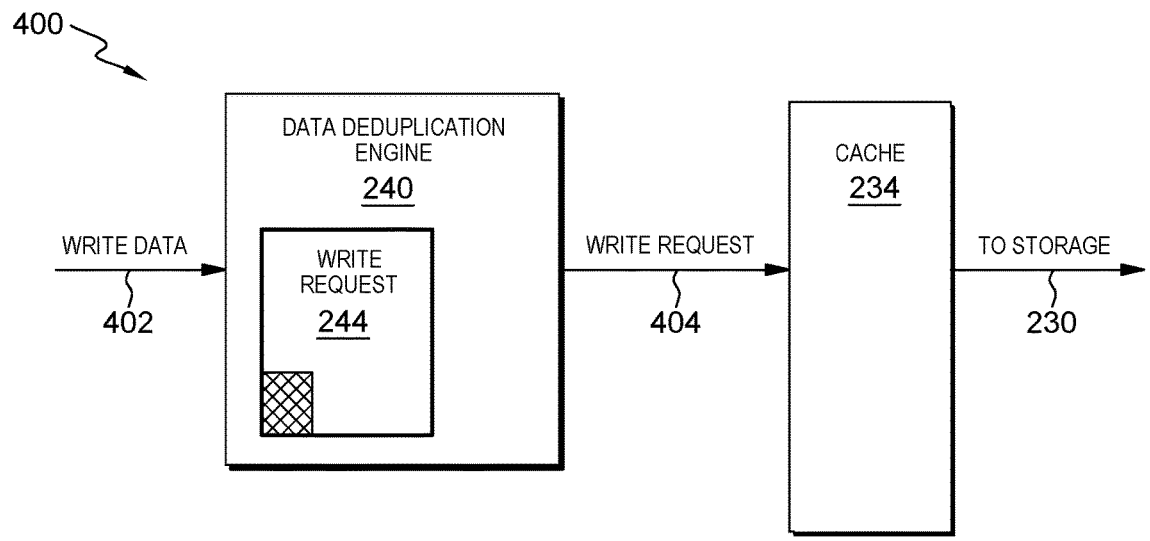
FIG. 4 is a block diagram of an exemplary process of writing data through a data deduplication engine that may be used in embodiments of the invention.

FIG. 4 is a block diagram in which various functional aspects of the present invention are depicted as an exemplary flow. Specifically, cache system 234 is shown to accept write data 402 to be processed through data deduplication engine 240 as a write operation 404 to cache 234. As the write data 402 is processed through the data deduplication engine 240, and as previously described, data deduplication ratios are associated with the write data. Deduplication is or is not performed on each block of the write data, and the write data passes through the deduplication engine 240, through the cache system 234, and ultimately to physically allocated storage 204.

As an example, consider the scenario of the online mobile databases (or, streaming videos). The sizes of these databases are vast, and such databases are candidates for deduplication.

It is possible to identify the sizes of the different movie files. Consider the movie files with huge sizes. To achieve a given deduplication ratio, as part of the data duplication, the blocks belonging to the later parts of the movie files are considered initially (probably with higher deduplication ratios), and finally the blocks belonging to the initial parts of the movie files are considered (probably with lower deduplication ratios). Video files which are small in size would be least considered for deduplication. This will increase the overall application performance, along with the access improvement of the individual files.

Without this technique, blocks related to the initial parts of the files would have been deduplicated and the reconstruction time for these deduplicated blocks would have been an overhead, when compared to the files with no deduplication for their blocks. In embodiments of the invention, parts of the online streams being accessed (by many users), would not be considered for deduplication (for example, in a movie, an action sequence, etc.).

In embodiments of the invention, application data can be categorized into hot data (most frequently accessed data), and cold data (rarely accessed data). Available storage capacity is layered into tiers (i.e., top to low tier) by underlying storage tiering software. Top-tier storage is costly, but has faster read/write access rates (access times are less). Low-tier storage is less expensive, but read/write access times are higher. The storage tiering software stores the hot data in the top-tier, and stores the cold data in the low-tier. The capacity of the top-tier storage is less, and the capacity of the low-tier storage is more (typically, less than 20% of the data only gets accessed more frequently).

Figure 5:
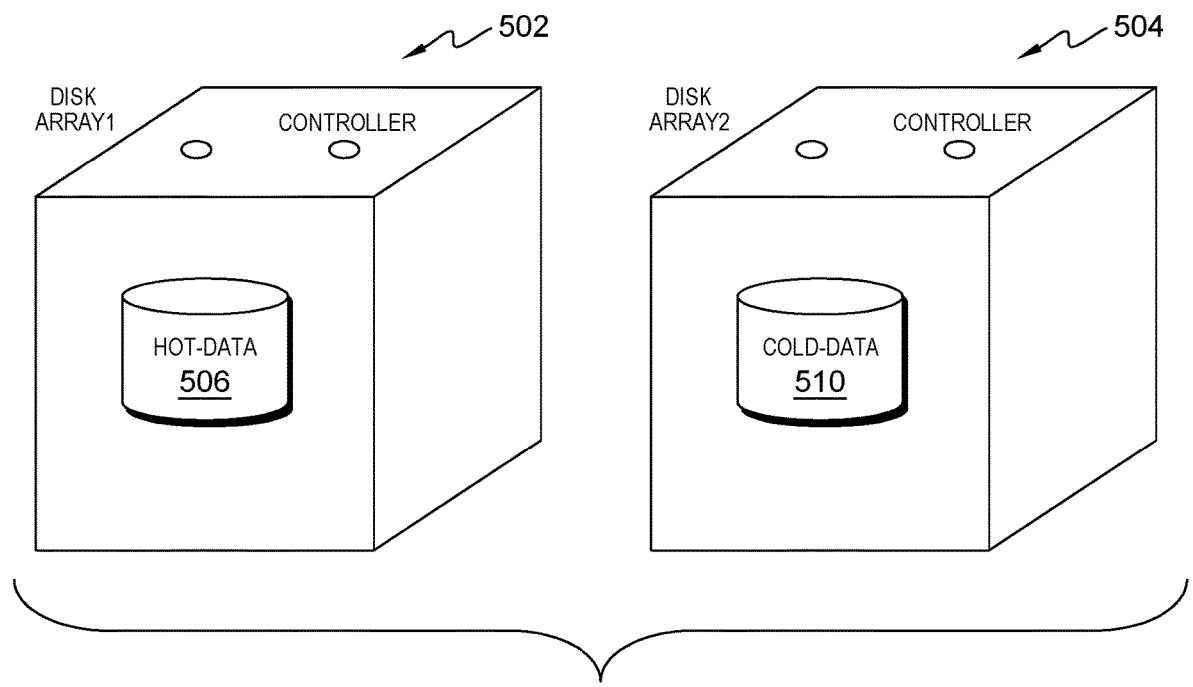
FIG. 5 illustrates a storage capacity layered into tiers that may be used to store deduplicated data in accordance with embodiments of the invention.

With reference to FIG. 5, in one example, the top-tier storage 502 is carved out of a SDD disk, and the low-tier storage 504 is carved out of a HDD/JBOD disk. In this example, there is one disk 506 representing the top-tier storage, which hosts the hot-data, and one disk 510 representing the low-tier storage, which hosts the cold-data. In this example, the size of the top tier storage is 40 GBs, and the size of the low tier storage is 160 GBs. Also, in this example, all this capacity is occupied.

In this example, the user/storage-provider wants to free 10% of the total occupied capacity by performing data deduplication. It may be noted that the access performance (both read and write) degrades after data deduplication.

One approach is to free 10% of the disk storage occupied from both of these disks 506, 510. In this case, the total storage freed is (40 GB×x10/100)+(160 GB×10/100)=20 GB of storage. The 40 GBs of hot-data originally allocated from the 40 GB of the top-tier storage 502 now resides in 30 GBs of the top-tier storage due to deduplication.

Another approach is to free 0% of the top-tier storage 502, and 12.5% of the low-tier storage 504 by applying data deduplication. In this case, the total storage freed is (40 GB×0/100)+(160 GB×12.5/100)=20 GB of storage. The hot data is not deduplicated, and hence there is no compromise in the access performance of the hot-data.

It is very clear that the second approach is more efficient, as the hot-data access performance is not compromised in this approach.

Embodiments of the invention can be used in the context of accessing data from the cloud. Embodiments of the invention can be used in scenarios in which quality of service (QoS) is in an agreement for the storage provider. In this scenario, when storage is provided to a client by third party vendors (for example, storage over the Cloud), if QoS is in the agreement, then the data related to that client could also be deduplicated following the techniques described herein.

Embodiments of the invention provide a number of important advantages. One advantage is that, by not applying deduplication on small size files, the access speeds of those files get improved drastically. Also, applying greater deduplication ratios on the blocks corresponding to the later parts of the file data, implies greater storage space reductions.

Embodiments of the invention use the feature of access utility for the files being accessed. Access utility can be defined in terms of user ratings, user likes, and other parameters.

While data deduplication considers blocks with more frequency of appearance on a storage disk, embodiments of this invention provide a method to consider the end user's access utility.

Figure 6:
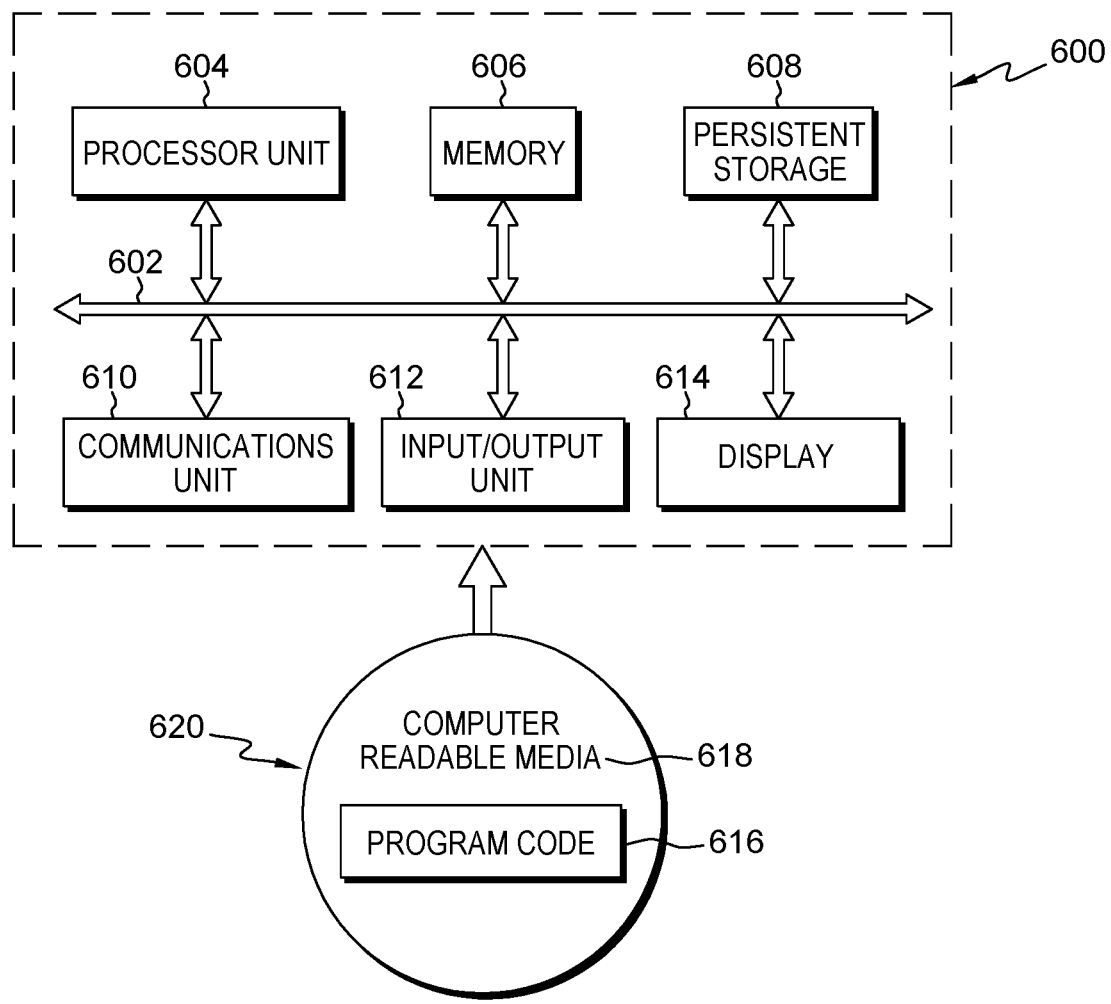
FIG. 6 depicts a processing unit that may be used in the computing environment of FIG. 1 or the data storage system of FIG. 2.

FIG. 6 depicts a diagram of a data processing system 600. Data processing system 600 is an example of a computer, such as, for example, computing systems 100, 122 or 124 in FIG. 1. In this illustrative example, data processing system 600 includes communications fabric 602, which provides communications between processor unit 604, memory 606, persistent storage 608, communications unit 610, input/output (I/O) unit 612, and display 614.

Processor unit 604 serves to execute instructions for software that may be loaded into memory 606. Processor unit 604 may be a set of one or more processors or may be a multi-processor core, depending on the particular implementation. Further, processor unit 604 may be implemented using one or more heterogeneous processor systems, or, as another illustrative example, processor unit 604 may be a symmetric multi-processor system containing multiple processors of the same type.

Memory 606 and persistent storage 608 are examples of storage devices. Memory 606, in these examples, may be, for example, a random access memory, or any other suitable volatile or non-volatile storage device. Persistent storage 608 may take various forms, depending on the particular implementation. For example, persistent storage 608 may contain one or more components or devices. For example, persistent storage 608 may be a hard drive, a flash memory, a rewritable optical disk, a rewritable magnetic tape, or some combination of the above.

Communications unit 610, in these examples, provides for communication with other data processing systems or devices. In these examples, communications unit 610 is a network interface card. Communications unit 610 may provide communications through the use of either or both physical and wireless communications links.

Input/output unit 612 allows for the input and output of data with other devices that may be connected to data processing system 600. For example, input/output unit 612 may provide a connection for user input through a keyboard, a mouse, and/or some other suitable input device. The input/output unit may also provide access to external program code 616 stored on a computer readable media 620. Further, input/output unit 612 may send output to a printer. Display 614 provides a mechanism to display information to a user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A method of performing data deduplication by a processor device, the method comprising:
    receiving input data for storage in a data storage, the input data comprising multiple input parts, each of the input parts including a plurality of data blocks, and wherein the data blocks are accessed at different times in the data storage by a given application; and
    selecting, by the processor device, one or more of the data blocks for data deduplication based on when in time the data blocks are accessed in the data storage by the given application, wherein the selecting one or more of the data blocks for data deduplication includes:
        associating a data deduplication ratio to each of the multiple input parts, and
        for each of the multiple input parts, data deduplicating the data blocks of the each input part to obtain the data deduplication ratio associated with the each input part.

2. The method according to claim 1, wherein the selecting one or more of the data blocks for data deduplication includes selecting the one or more of the data blocks for data deduplication to obtain a target deduplication ratio.

3. The method according to claim 1, wherein the selecting one or more of the data blocks for data deduplication includes selecting for the data deduplication ones of the data blocks that are accessed by the given application later in time relative to others of the data blocks that are accessed by the given application earlier in time.

4. The method according to claim 1, further comprising:
    the given application accessing initial ones of the data blocks; and
    while the given application is accessing the initial ones of the data blocks, reconstructing later deduplicated others of the data blocks.

5. The method according to claim 1, wherein the selecting one or more of the data blocks for data deduplication includes:
    deduplicating initially accessed ones of the data blocks at a lower deduplication ratio; and
    deduplicating later accessed others of the data blocks at a higher deduplication ratio.

6. The method according to claim 1, wherein the selecting one or more of the data blocks for data deduplication includes identifying ones of the data blocks based on defined criteria as not to be deduplicated.

7. The method according to claim 1, wherein the selecting one or more of the data blocks for data deduplication includes:
    initially considering for the data deduplication ones of the data blocks that are accessed later by the given application; and
    later considering for the data deduplication other ones of the data blocks that are accessed earlier by the given application.

8. The method according to claim 1, further comprising:
storing each of the data blocks in one of a plurality of storage areas of the data storage based on given criteria; and wherein:
the selecting one or more of the data blocks for data deduplication includes selecting for the data deduplication only the ones of the data blocks in a specified one or more of the storage areas.

9. The method according to claim 1, wherein the selecting one or more of the data blocks for data deduplication includes selecting one or more of the data blocks for data deduplication based on a defined access utility for the data blocks.

10. A system for managing data storage on a computer by performing selective data deduplication, the system comprising:
a data storage for receiving and storing input data, the input data comprising multiple input parts, each of the input parts including a plurality of data blocks, and wherein the data blocks are accessed at different times in the data storage by a given application; and
a deduplication processor device for data deduplicating a selected one or more of the data blocks based on when in time the data blocks are accessed in the data storage by the given application to reduce storage space in the data storage needed to store the data blocks, the deduplication processor device associating a data deduplication ratio to each of the multiple input parts of the input data, and data deduplicates the data blocks of the each of the input parts to obtain the data deduplication ratio associated with the each input part.

11. The system according to claim 10, wherein the deduplication processor devices selects one or more of the data blocks for data deduplication to obtain a target deduplication ratio.

12. The system according to claim 10, wherein the deduplication processor device:
deduplicates initially accessed ones of the data blocks at a lower deduplication ratio; and
deduplicates later accessed other ones of the data blocks at a higher deduplication ratio.

13. The system according to claim 10, wherein:
each of the data blocks is stored in one of a plurality of storage areas of the data storage based on given criteria; and
the deduplication processor device selects for data deduplication only the ones of the data blocks in a specified one or more of the storage areas.

14. A computer readable program storage device for performing data deduplication, the computer readable program storage device comprising:
a computer readable storage medium having program instructions embodied therein, the program instructions executable by a computer to cause the compute to perform the method of:
receiving input data for storage in a data storage, the input data comprising multiple input parts, parts including a plurality of data blocks, and wherein the data blocks are accessed at different times in the data storage by a given application; and
selecting, by a processor device, one or more of the data blocks for data deduplication based on when in time the data blocks are accessed in the data storage by the given application, and the selecting one or more of the data blocks for data deduplication includes:
associating a data deduplication ratio to each of the multiple input parts, and
for each of the multiple input parts, data deduplicating the data blocks of the each input part to obtain the data deduplication ratio associated with the each input part.

15. The computer readable program storage device according to claim 14, wherein the selecting one or more of the data blocks for data deduplication includes selecting the one or more of the data blocks for data deduplication to obtain a target deduplication ratio.

16. The computer readable program storage device according to claim 14, wherein the selecting one or more of the data blocks for data deduplication includes:
deduplicating initially accessed ones of the data blocks at a lower deduplication ratio; and
deduplicating later accessed other ones of the data blocks at a higher deduplication ratio.

17. The method according to claim 1, wherein the selecting one or more of the data blocks for data deduplication includes selecting one or more of the data blocks for data deduplication based on whether the data blocks are accessed early or late in the time when the data blocks are accessed in the data store by the given application.

* * * * *